US008296472B2

(12) United States Patent
Cota-Robles et al.

(10) Patent No.: US 8,296,472 B2
(45) Date of Patent: Oct. 23, 2012

(54) SAFELY SHARING USB DEVICES DURING A SWITCH IN STATE

(75) Inventors: Erik Cota-Robles, Mountain View, CA (US); Igor Korsunsky, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/445,703

(22) Filed: Apr. 12, 2012

(65) Prior Publication Data
US 2012/0198097 A1 Aug. 2, 2012

Related U.S. Application Data

(62) Division of application No. 12/795,352, filed on Jun. 7, 2010, now Pat. No. 8,166,211.

(51) Int. Cl.
*G06F 3/00* (2006.01)
*G06F 13/00* (2006.01)
(52) U.S. Cl. .................. 710/14; 710/5; 710/8; 710/15; 710/36
(58) Field of Classification Search .......... None
See application file for complete search history.

(56) References Cited

U.S. PATENT DOCUMENTS

2005/0246723 A1 11/2005 Bhesania et al.
2011/0047542 A1 2/2011 Dang et al.

OTHER PUBLICATIONS

"USB Drivers", Jan. 21, 2005, LWN.net, [online, accessed on Sep. 8, 2011], URL: http://lwn.net/images/pdf/LDD3/ch13/pdf.
Ben-Yehuda, Muli, "Introduction to Linux Device Drivers", 2005, Technion, [online, accessed on Sep. 10, 2011], URL: http://www.mulix.org/lectures/intro_to_linux_device_drivers/intro_linux_device_drivers.pdf.
U.S. Appl. No. 12/795,352, filed Jun. 7, 2010, titled "Safely Sharing USB Devices".

*Primary Examiner* — Scott Sun

(57) ABSTRACT

System and methods for safely sharing universal serial bus (USB) devices are provided. A request is received to switch from a state in which user mode drivers are not enabled to a state in which user mode drivers are enabled. For each kernel mode USB driver in the system, an I/O control (IOCTL) is called in each kernel mode USB driver. The IOCTL requests that the kernel mode USB driver yield devices on which it has a claim. Also, for each kernel mode USB driver in the system, it is determined if the kernel mode USB driver will yield one or more devices on which it has a claim. For each kernel mode USB driver that will yield and for each device claimed by the kernel mode USB driver for which the kernel mode USB driver respects a request to unclaim the device, a process is executed as if there had been a hot unplug event on the device.

18 Claims, 18 Drawing Sheets

/$/proc/bus/usb

| Device | Kernel Mode USB Driver | Available for user mode drivers? | In use? | Unclaim requested? |
|---|---|---|---|---|
| 350 | 352 | 650 | 652 | 654 |

SAFELY SHARING USB DEVICES DURING A SWITCH IN STATE

CROSS REFERENCE TO RELATED APPLICATIONS

The present application is a divisional of U.S. application Ser. No. 12/795,352 for "Safely Sharing USB Devices" filed Jun. 7, 2010, the contents of which is incorporated herein by reference in their entirety.

BACKGROUND

In computing, an operating system (OS) is software that acts as an interface between the computer hardware and the user, and as such, is responsible for managing and coordinating the requests that user applications make to the computer hardware. FIG. 1 is a diagram illustrating an operating system acting as an interface between the user and the computer hardware. As illustrated at 110 and 120, operating systems divide the software running in the computer into different layers, user space 110 and the kernel 120. Applications running in user space illustrated at 112, 114, and 116 include user software such as a text editors, email programs, and web browsers. Applications running in user space may be referred to as user space applications or user mode applications.

As is well known to those skilled in the art, the kernel 120 comprises the software code that actually runs the computer system. A non-exclusive list of the tasks performed by the kernel includes, managing the code processes for the user mode applications, managing the communications between the hardware and software components, allocating the central processing unit ("CPU") among the application code processes, handling sensitive resources, managing input/output requests to the hardware, and implementing security. One way in which the kernel 120 implements security and reliability barriers is by preventing user mode applications from directly accessing kernel resources, such as the computer hardware. Operating systems provide different levels of access to resources and only the kernel has privilege to directly access most hardware resources, while user mode applications must in general use kernel services such as system calls. This concept is illustrated in FIG. 1, in which the kernel 120 is shown between user space 110 and the hardware layer 130. The hardware layer consists of the computer hardware, such as one or more processors (CPU's) 136, system memory 137, a storage device, such as a disk 138, busses, such as USB buses 132, 136, and attached peripheral devices, such as USB devices 138, 140, and 142. A user mode application does not have permission to access the underlying computer resources, such as printers, flash drives, or other peripherals attached to the computer. Thus, a user mode application cannot directly perform operations that it needs, such as input/output "I/O" operations to a device attached to the system, e.g. a printer or flash drive. A user mode application must therefore make requests to the operating system to perform those tasks that it does not have the requisite permissions to execute. These requests are referred to as system calls, which provide the interface between a process in a user mode application and a service that the kernel provides. System calls are illustrated at 150, 152, 154, 156, and 158 of FIG. 1. For example, a user mode application may want to read a file from a flash drive. Because the user mode application cannot directly access the flash drive it will make a system call to the kernel, such as the "read" system call. The kernel will then translate the system call into an I/O command, send that request to the hardware, receive data from the hardware, and return the data to the user mode application. I/O commands from the kernel to the hardware layer are illustrated at 170, 172, and 174 of FIG. 1. System calls include open, read, write, and IOCTLs. As indicated by their names, open will open a hardware device; read will read data from a device; write will write data to a device; and exit will exit the use of a device. IOCTL system calls are described in more detail below.

USB

As illustrated at 130 of FIG. 1, the hardware layer of a computer may include the hardware in the computer such as the busses, and peripheral devices 138, 140 and 142 that are attached to the computer. Peripheral devices may be attached to a computer using the USB ("Universal Serial Bus.") protocol. The USB protocol allows a variety of peripherals devices such as mice, keyboards, digital cameras, printers, personal media players, flash drives, smartphones and PDAs to be attached to the USB through a consistent interface. As illustrated in FIG. 1, USB peripheral devices 138, and 140, are attached to USB Bus001 132 through host controllers 180, and 182. Peripheral device 142 is attached to USB Bus002 134 through host controller 184. The host controllers 180, 182, and 184 connect the host computer system to the USB devices.

Because there are a variety of devices that can be attached to the computer system through USB and other methods, it is useful to have specific software modules to control I/O to specific devices, rather than having to program the kernel so that it knows how to handle the I/O for every device that may be attached to the computer. Additionally, new devices are always being developed, and thus, the kernel cannot be programmed to control every possible device that may be attached to the computer. These software modules are referred to as "device drivers" or simply "drivers." A driver acts as a translator that converts the more general I/O instructions of the operating system to messages that can be understood by a specific device type with which that driver is associated. One family of drivers is the kernel mode USB drivers, which are loaded by the kernel and run with full privilege. There are also user mode applications programmed to control USB devices, which are referred to as "user mode USB drivers." User mode USB drivers run with user privilege, and thus, must communicate with USB devices via system calls to the kernel.

Kernel Mode USB Drivers

FIG. 2A is a diagram illustrating kernel mode drivers for USB devices. As illustrated in FIG. 2A kernel mode USB drivers 200, 202, and 204 run in kernel space. User mode applications 112, 114, and 116 make system calls 150, 152, 154, 156 and 158 to the kernel mode USB drivers 200, 202, and 204. The kernel mode drivers then translate the system calls to specific I/O commands 210, 212, 214, 216 and 218 for the specific type of devices with which they are associated. In the example illustrated in FIG. 2A kernel mode USB driver 200 is associated with USB device 138, kernel mode USB driver 202 with USB device 140, and kernel mode USB driver 204 with USB device 142. As example of this process, user mode application 112 could be a text editor application needing to save a document to USB device 138 which could be a USB flash drive. The text editor might issue a write system call to the USB driver 200 associated with the flash drive 138. Device driver 200 would then translate the system call to a specific I/O command 210 to the USB device 138. For simplicity, FIG. 2A illustrates one kernel mode USB driver for each user mode application and USB device. However, different user mode applications may use the same kernel mode USB driver. For example, both a text editor and a browser may use the same kernel mode USB driver to send output to the same printer. Also, two devices may be claimed by the same kernel mode USB driver. For example, both a mouse and a keyboard may be claimed by the same USB HID driver discussed below.

An example of a kernel mode USB driver includes, but is not limited to, the USB (Human Interface Diver) ("HID"), which supports human interfaces devices such as keyboards and mice. Another example is the USB storage device driver, which is a kernel mode driver that supports devices such as disks, flash drives, floppy drives, cd roms, and other types of storage. There are also USB host controller drivers in the kernel which control USB host controllers. As explained above and as illustrated at 180, 182 and 184 of FIG. 2A host controllers connect the host computer system to the USB devices. There may be additional USB drivers in the kernel that are written for specific devices. For example, USB drivers that correspond to specific vendors and models of the various peripheral devices such as printers, video cameras, phones, etc. may be added to the kernel. There is a data structure in the kernel core library that stores an entry for every kernel mode USB driver in the system. FIG. 2B is a diagram illustrating such as data structure for the system depicted in FIG. 2A with kernel mode USB drivers 200, 202, and 204.

In order for a kernel mode USB driver to interface with a specific USB device, the device must be "claimed" by the driver. For example, if the device is a keyboard or mouse, the HID device driver may claim the device. The method for a device to be claimed by a kernel mode USB driver is well known in the art of computer software. To provide an illustrative example, FIG. 3A is a flow chart depicting the method in an operating system which uses a probe routine in the kernel mode USB driver to claim a device. Such operating systems include, but are not limited to, UNIX, LINUX, and VMware® ESX offered by VMware Inc. of Palo Alto, Calif.

At step 302, notification is received that a USB device has been newly attached to the system. Operating systems are programmed to provide a notification to the kernel whenever a new USB device is attached to a bus. At step 304, the device is presented to the first registered kernel mode USB driver in the data structure that stores device drivers illustrated at 250 of FIG. 2B.

At step 306 it is determined whether the USB driver matches the device that has been presented. In an operating system using probe routines, each kernel mode USB driver contains a probe routine that queries the device to determine whether there is a match, i.e. whether the driver recognizes the device as a device with which it knows how to interface. When the device is presented to a kernel mode driver in the data structure illustrated in FIG. 2B, the kernel core library calls the probe routine for that driver. If the probe routine recognizes the device, it can "claim" the device and take over its I/O management. For example, a mouse would match a HID driver, and a specific make and model of a printer would match the driver with that specific make and model.

As shown in 308, if the device matches the driver, the driver "claims" the device, i.e. the device is marked as being claimed by the driver and this method ends. Marking a device as claimed by a driver may be done by indicating the kernel mode driver claiming the device in a data structure for the device as is well known in the art. For example, in some operating systems including, but not limited to UNIX, LINUX, and VMware® ESX, when a new USB device is attached to the system, the kernel core library creates a data structure for that device and begins filling information about the device into the data structure. FIG. 3B is a diagram illustrating the data structure for USB Device 138 of FIG. 2A. As shown at 352, one field in the data structure indicates which kernel mode USB driver claims the device.

If the device does not match the driver, then at 310 it is determined if there are any more kernel mode USB drivers to which the device should be presented, i.e. whether there are any further kernel mode drivers in the data structure depicted in FIG. 2B to which the device has not been presented. If there is an additional kernel mode USB driver in the data structure at 312 in FIG. 3A, the newly attached device is presented to the next driver in the data structure sequentially, and the method repeats steps 306 and continues.

If there are no further kernel mode USB drivers in the data structure, then at 314 the device is placed in a queue of devices to which there are no register matching kernel mode USB drivers and then presented to any newly added kernel mode USB drivers.

Thus, if there is a kernel mode USB driver on the system that matches a newly attached device, it is deterministically decided that the particular USB driver will claim the device, and be allowed to issue I/O commands to that device. This claiming method is robust, meaning that other kernel mode USB drivers on the system will not be allowed to control the device while it is claimed by the kernel mode USB driver.

User Mode Device Drivers

As opposed to kernel mode drivers, user mode drivers run in user space. FIG. 4A is a diagram illustrating user mode USB drivers. Like kernel mode drivers, user mode drivers control specific types of USB devices attached to the system. FIG. 4A depicts user mode drivers 117, 118, and 120 running in user space. Just like any other user mode driver, USB user mode drivers issue open, close, read, write and IOCTL (short for "I/O control") system calls to the kernel. Unlike most other user mode drivers, user mode USB drivers use the IOCTL system call as illustrated at 402, 404, and 406, for both control I/O and data I/O. IOCTLs are generic system calls that allow user mode applications to communicate with kernel modules and perform arbitrary device specific operations; and thereby pass information that is specific to a particular device. Each IOCTL command contains a device specific subcommand that controls how the kernel interprets the command. In the case of USB IOCTLs these subcommands are USB specific and include commands to transmit "bulk", "control" and "interrupt" data to/from a USB device (e.g., USBDEVFS_BULK) as well as more conventional "device control" subcommands such as the one to reset the USB device (USBDEVFS_RESET) and a host of others which are well known to those skilled in the art. Thus IOCTL system calls to USB devices are translated into both control as well as regular I/O to the USB devices. Therefore, the same IOCTL may be used by different user mode drivers to communicate different types of information to different devices, making them particularly useful for user mode devices drivers.

Implementing user mode drivers is well known in the art of computer software. As an illustrative example, many operating systems, including but are not limited to, UNIX, LINUX, and VMware® ESX, allow for implementing user mode drivers through their device files as illustrated at 430, 432, and 434 of FIG. 4. In such operating systems there is a dynamic file system in the kernel that presents a view into the device structure of the actual physical hardware of the devices attached to the system.

Each file in the file system corresponds to a device attached to the computer. The kernel presents the I/O interface for each device as a file, such that reading and writing to the device may be performed using the same format as reading and writing to a file. For USB devices this file system is often referred to as the USB file system or simply "usbfs." Devices that can be accessed as a stream of bytes, such as printers, cameras, smartphones, are referred to as character devices, with the files corresponding to each of these devices referred to as "chardev" files. In Linux systems, the usbfs is generally mounted in the /proc file system, which provides information about all running processes in the system. Therefore, the device files are often referred to in Linux as "proc nodes." FIG. 4B is a diagram illustrating an example of a usbfs in Linux for the USB devices illustrated at 138, 140, and 142 of FIGS. 1, 2A and 4.

The /proc/bus/usb/devices file contains a list of all USB devices attached at that moment in time, and provides other USB-specific information about each device. The file /proc/bus/usb/001/001 FIG. 4B at 452 would be the device file for USB device 138, and would include information about that device. The file/proc/bus/usb/002/001 FIG. 4B at 458 would be the device file for USB device 142. These device files support a wide range of IOCTL calls that allow user mode applications to send and receive USB data from the device, and thus are useful to user mode USB drivers.

Because usbfs presents the I/O interface for each device as a file, reading and writing to the device may be performed using the same format as reading and writing to a file. Therefore, some user mode drivers may read and write to devices by issuing system calls such as IOCTLs to the device file as depicted at 430, 432, and 434 of FIG. 4A. Writes to device files are translated into the actual output to the device. In the case of USB user mode drivers all writes to USB devices are issued via IOCTLs using the aforementioned "bulk", "control" and "interrupt" subcommands. One method for writing user mode USB drivers is to write them using Libusb. Libusb is a library that works on a variety of different operating systems including Linux, BSD and Mac OS X. As illustrated at FIG. 4A at 420, Libusb is an interface between a user mode USB driver and the kernel. Libusb translates user mode functions into IOCTLs and other system calls that must be made to the kernel in order to implement the functions in the user mode USB driver. Libusb conceals the low-level kernel interactions with the USB modules. It provides a set of functions which are adequate to develop a device driver for a USB device in user space.

As opposed to the method used by kernel mode USB drivers for claiming a device, user mode USB drivers may claim a device, i.e. gain control of that device, simply by opening the device for write, i.e. opening the device file in order to perform a write to the device. As explained above, the process for a kernel mode USB driver to claim a device allows for robust sharing of devices between entities, meaning that while one kernel mode USB driver has claimed a device, no other kernel mode USB driver may interrupt the I/O process of the kernel mode device driver on the device. In contrast, a user mode USB driver may claim a device that another entity is currently using, without even notifying the entity and allowing it to shut down its session cleanly. The other entity may be a kernel mode driver or another user mode driver. For example, it is possible to abort a filecopy to a USB storage device by use of a simple libusb program as illustrated in FIG. 5. The usbChardev test shown in the right hand window 504 run on the host terminal aborted a filecopy on a storage device attached to a virtual machine as shown at 502. For USB there is an additional problem. USB devices are arranged hierarchically, i.e. in a tree structure with devices connected to a hub. If hubs and host controllers are not protected from a user mode USB driver then it is possible to bring down all of the USB devices on a hub even if the device itself were to be protected against user mode drivers.

While user mode drivers present a problem when they gain control of a device by opening the device for a write, they do not create such a problem when they issue read-safe IOCTLs to the device, i.e., IOCTLs that access a device to read from the device and that have been determined to not interfere with other drivers, whether kernel mode or user mode, accessing the device. It is useful to allow limited access to all devices for read-safe IOCTLs. Therefore, it would be useful to have systems and methods for preventing a user mode USB driver from claiming a USB device that is claimed by a USB kernel driver or in use by another user mode USB driver, and performing operations on that device other than read-safe IOCTLs.

SUMMARY

System and methods for safely sharing universal serial bus (USB) devices are provided. A request is received to switch from a state in which user mode drivers are not enabled to a state in which user mode drivers are enabled. For each kernel mode USB driver in the system, an I/O control (IOCTL) is called in each kernel mode USB driver. The IOCTL requests that the kernel mode USB driver yield devices on which it has a claim. Also, for each kernel mode USB driver in the system, it is determined if the kernel mode USB driver will yield one or more devices on which it has a claim. For each kernel mode USB driver that will yield and for each device claimed by the kernel mode USB driver for which the kernel mode USB driver respects a request to unclaim the device, a process is executed as if there had been a hot unplug event on the device.

BRIEF DESCRIPTION OF THE DRAWINGS

FIG. 4B is a diagram illustrating an example of a USB File system ("usbfs") in the Linux operating system.

Figure 5:
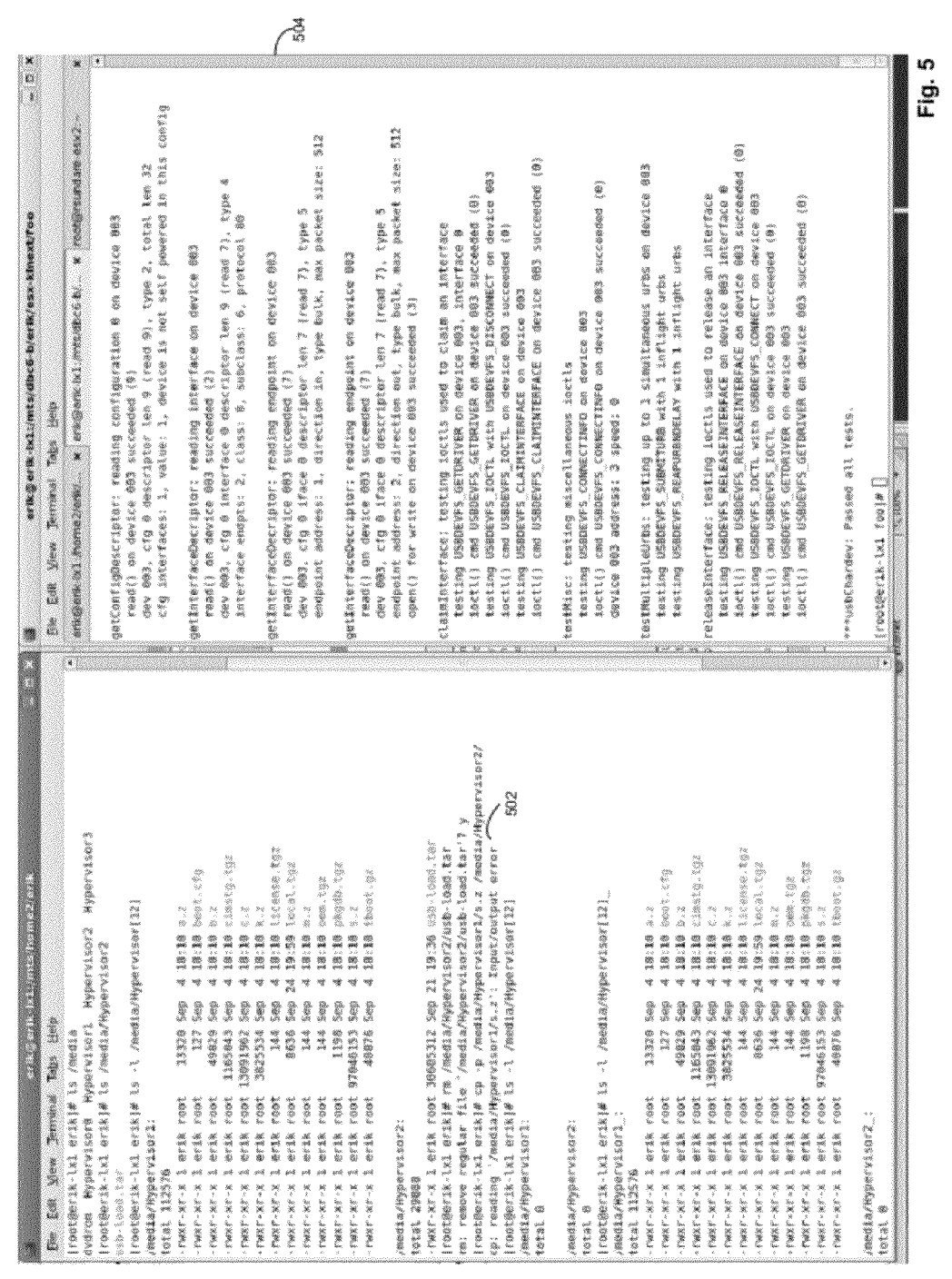

FIG. 5 is a screen shot showing a filecopy to a USB storage device that was aborted by a user mode USB driver.

FIG. 6B is a diagram illustrating a data structure the kernel core library stores for each USB device attached to the system with an added field for marking the device either available or unavailable for user mode USB drivers

DETAILED DESCRIPTION

The invention can be implemented in numerous ways, including as a process, an apparatus, a system, a composition of matter, or a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 6A:
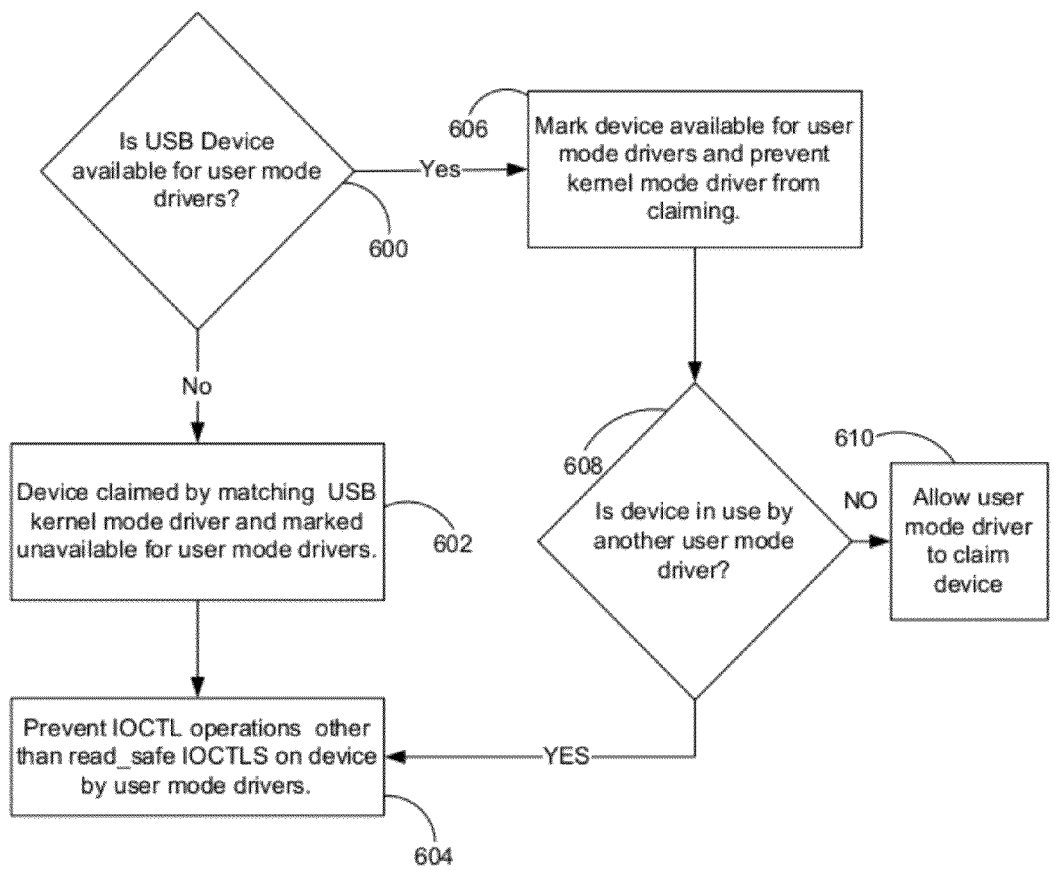
FIG. 6A is a flow chart illustrating an embodiment of a method for preventing a user mode USB driver from performing operations other than read-safe IOCTLs on a USB device that is claimed by a kernel mode driver

FIG. 6A is a flow chart illustrating an embodiment of a method for preventing a user mode USB driver from performing IOCTL operations other than read-safe IOCTLs on a USB device that is claimed by a kernel mode driver.

Figure 7:
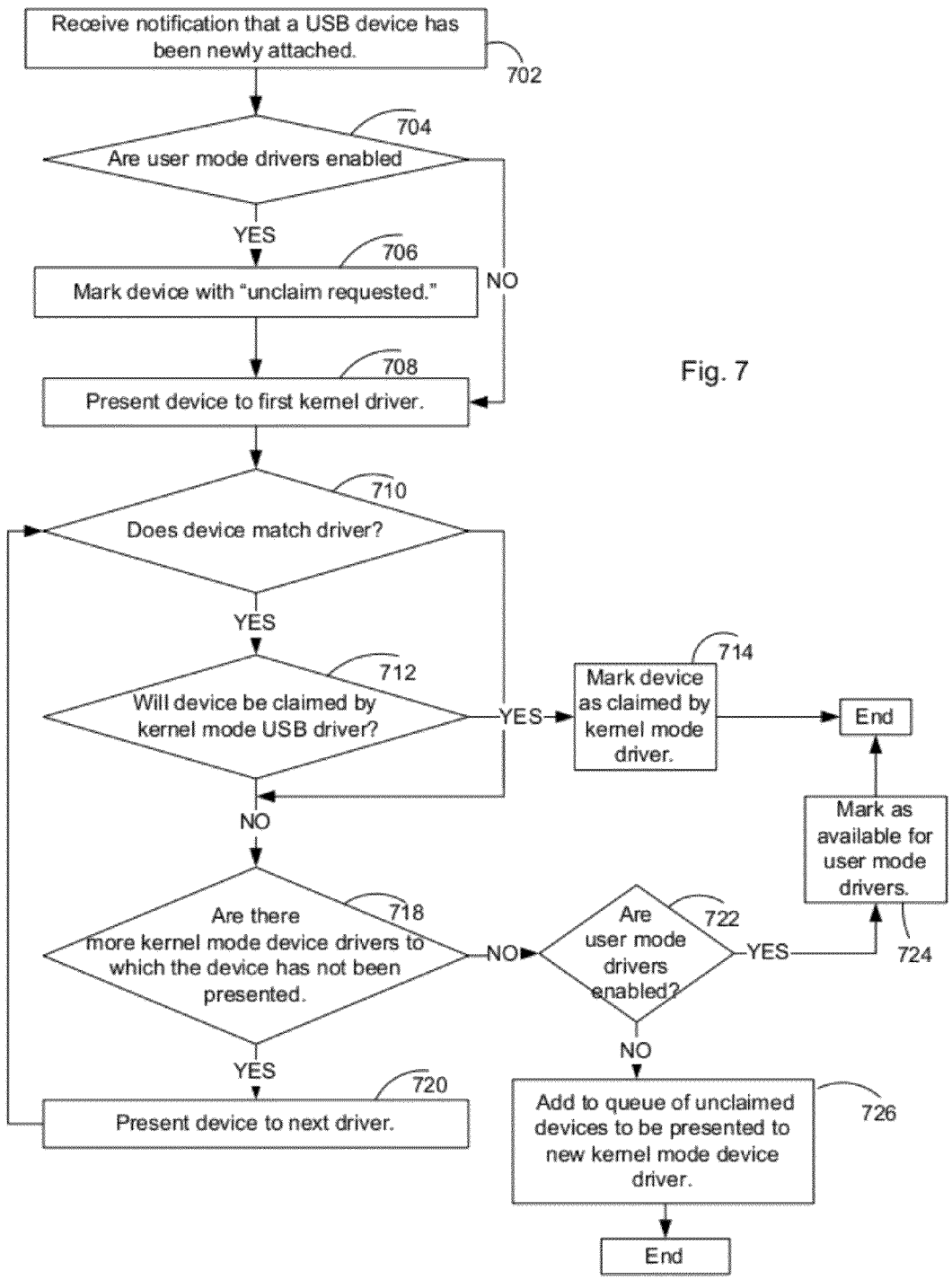
FIG. 7 is a flow chart illustrating an embodiment of a method for determining whether a device is available to be claimed by user mode USB drivers.
Figure 8:
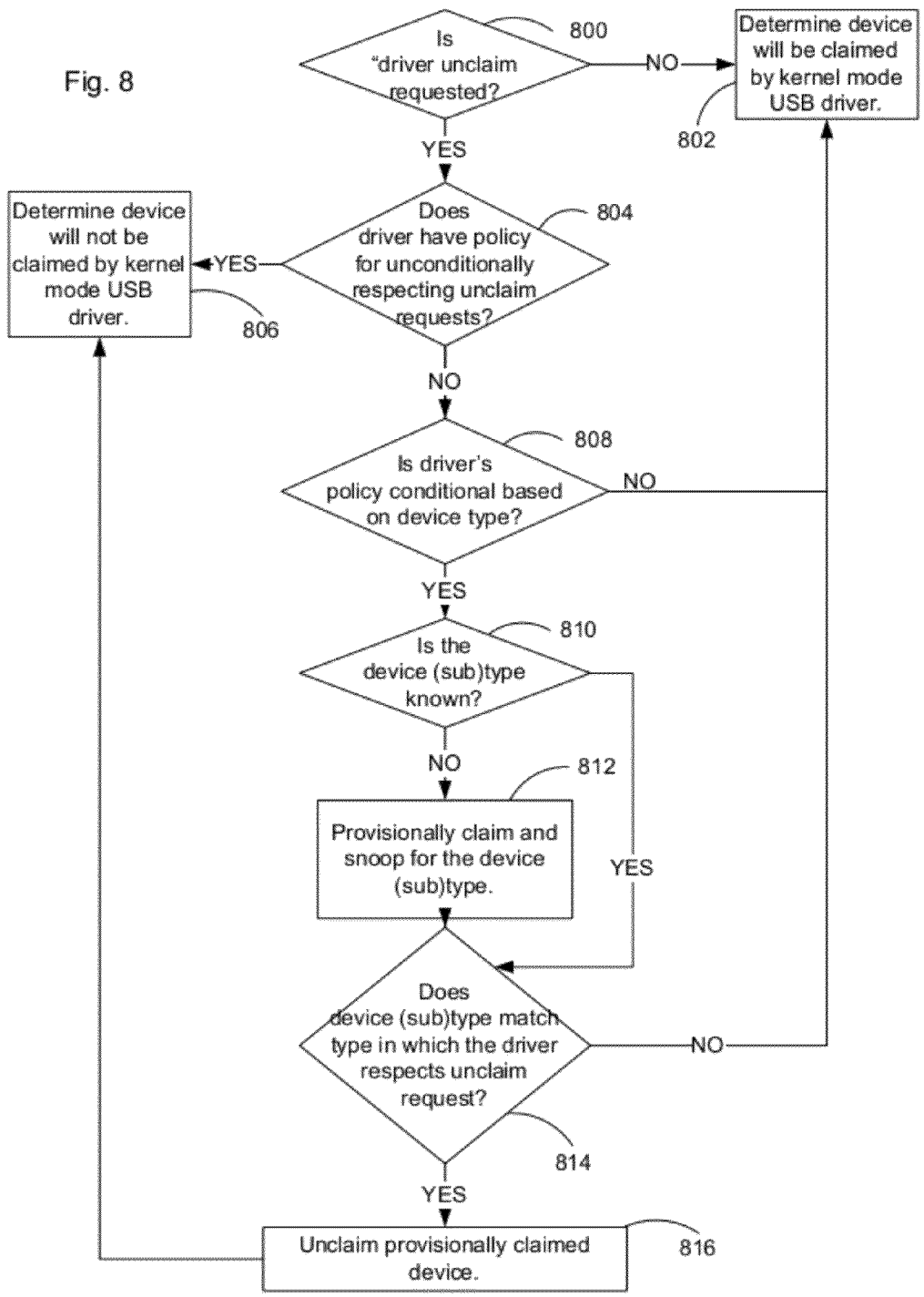
FIG. 8 is a flow chart depicting in more detail an embodiment of step 712 if FIG. 7, determining whether a device driver that matches a device will claim the device.

At 600 it is determined if a USB device is available to be claimed by user mode USB drivers. FIG. 7 and FIG. 8 provide more detailed descriptions of how it may be determined if the USB device is available to be claimed by user mode USB drivers in some embodiments. If at 600 it is determined that the device is available to be claimed by user mode USB drivers, then at 606 the device is marked as available for user mode USB drivers and the kernel mode USB drivers are prevented from claiming the device.

Marking a device as available may be performed in a variety of ways that are well known in the field of computer science. In some embodiments, marking the device as available for user mode USB drivers may comprise marking an added field in the kernel core library data structure for the device. FIG. 6B is a diagram illustrating a kernel mode data structure for a device, such as the data structure illustrated at FIG. 3B with an added field at 650 for marking the device either available or unavailable for user mode USB drivers.

Figure 9A:
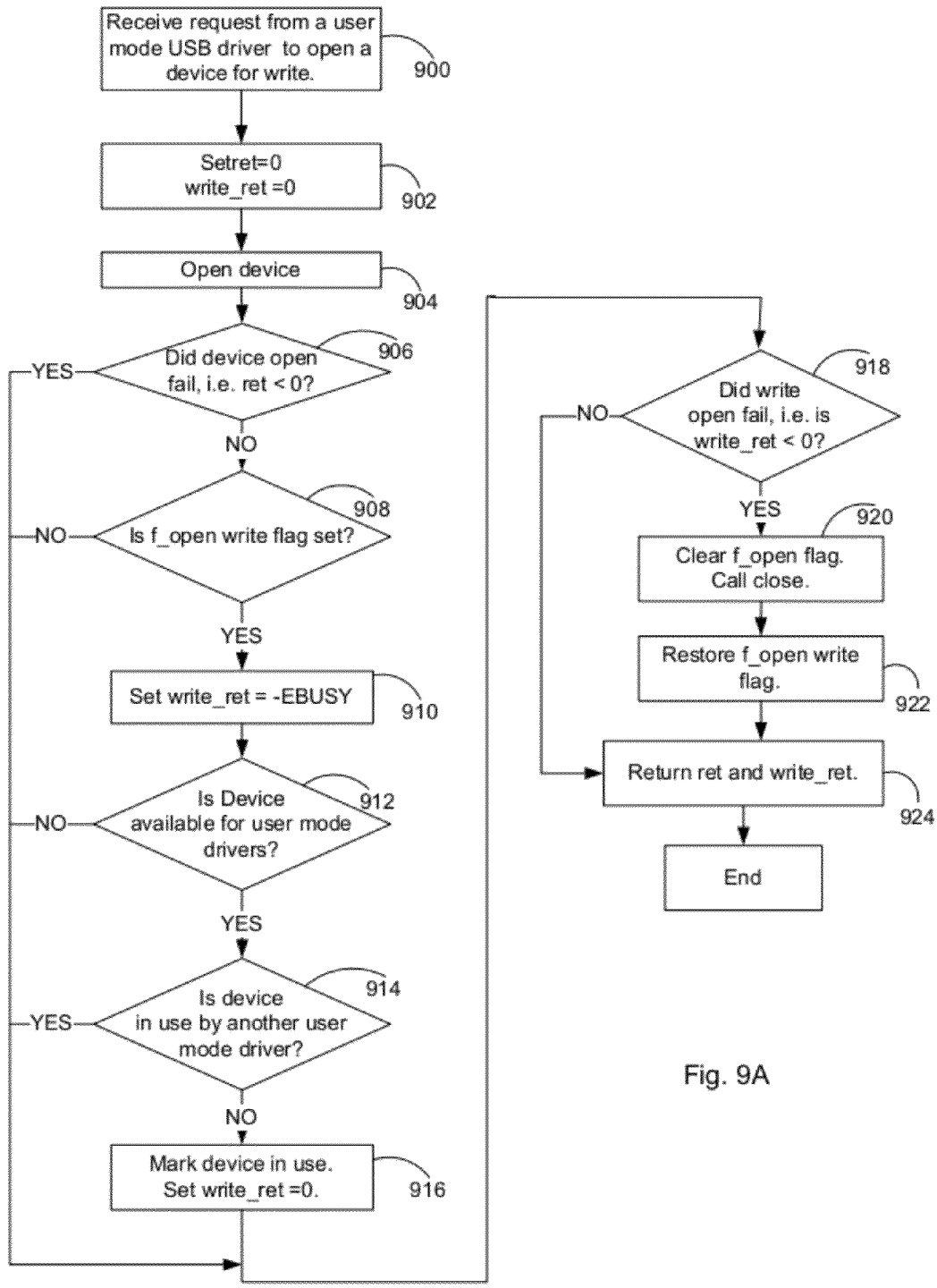
FIG. 9A is a flow chart illustrating an embodiment of a method for preventing a user mode USB driver from opening a device for write if the device is claimed by a kernel mode driver or in use by another user mode USB driver.

When a device has been marked available for user mode USB drivers, a user mode USB driver is allowed to claim the device at 610 of FIG. 6B, i.e. open the device file for write, as long as the device is not in use by another user mode USB driver as determined at 608. In some embodiments, determining if the device is in use by another driver may comprise checking an added field illustrated in FIG. 6B at 652 in the kernel mode core library data structure for the device. FIG. 9A provides a more detailed description of how a user mode USB driver may be allowed to open a device for write as long as it is not in use by another user mode USB driver. Even if the device is in use by another user mode USB driver, user mode USB drivers are allowed to perform read-safe IOCTLs on the device as shown at 610 of FIG. 6A, as illustrated in more detail in FIG. 10.

If at 600 it is determined that the USB device is not available to be claimed by user mode USB drivers, then at 602 the device is claimed by the matching kernel mode USB driver and marked unavailable for user mode USB drivers. In some embodiments, marking the device as unavailable for user mode USB drivers may comprise marking an added field in the kernel core library data structure for the device as depicted at 650 of FIG. 6B. When the device is unavailable, the field may contain a "N" or a variety of other indications.

Figure 10:
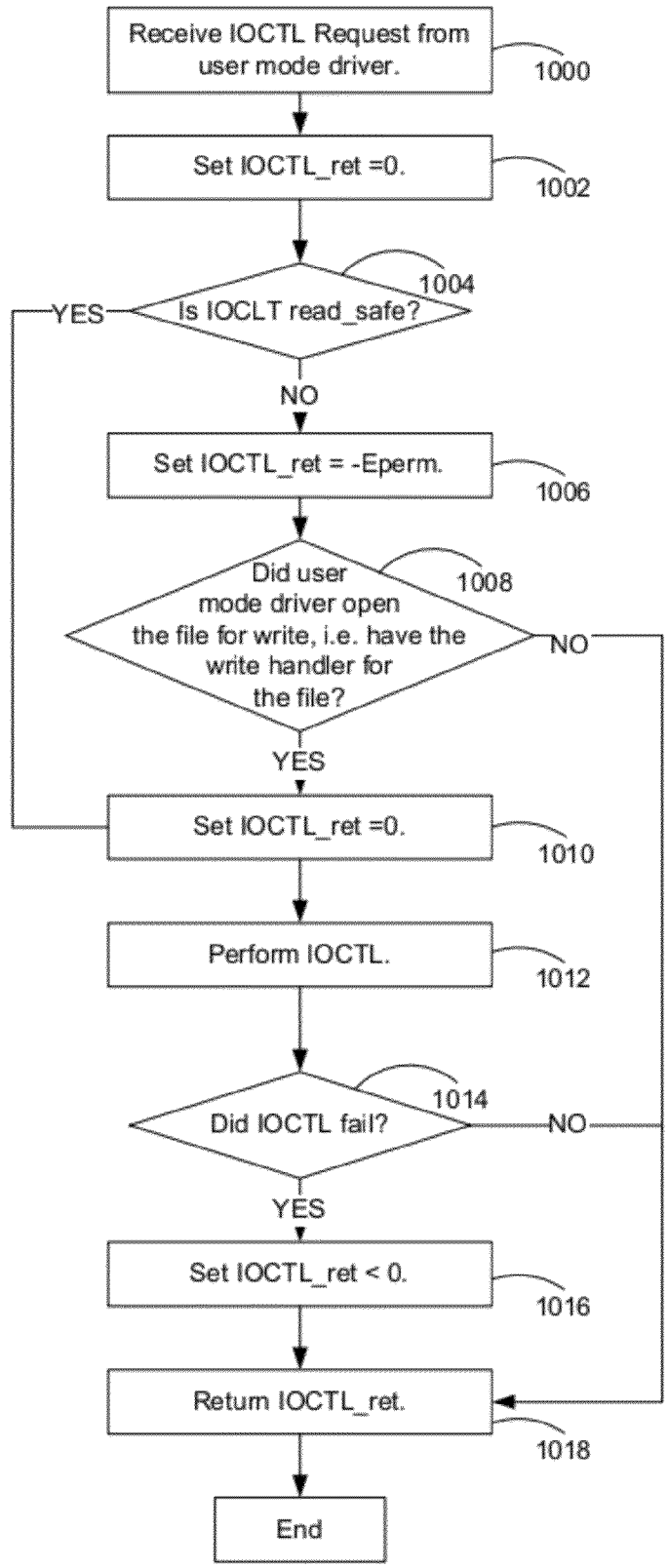
FIG. 10 is a flow chart illustrating an embodiment of a method for preventing a user mode USB driver from performing operations on a device other than read-safe IOCTLs unless the driver has successfully opened the file for write.

At 604, IOCTL operations on the device other than read-safe IOCTLs are prevented by user mode USB drivers. FIGS. 9A and 10 provide more detailed descriptions of how user mode USB drivers may be prevented from performing operations other than read-safe IOCTLs on a device that has been marked as unavailable for user mode USB drivers.

FIG. 7 is a flow chart illustrating an embodiment of a method for determining whether a device is available to be claimed by user mode USB drivers. The embodiment shown in FIG. 7 extends the method illustrated in FIG. 3 and described in the background for kernel mode drivers to claim USB devices. The method in the example shown in FIG. 7 is performed by the kernel calling the probe routine of the registered kernel mode USB drivers.

At 702 notification is received by the kernel that a USB device has been newly attached to the system. This step corresponds to step 302 of FIG. 3. At 704 it is determined whether the system is in the state of "user mode USB drivers enabled." In some embodiments there is a global setting in the operating system for the state of either "user mode drivers enable" or "user mode drivers not enable." At 704 this setting is checked.

If the state is "user mode drivers enabled," then at 706, the device is marked with "unclaim requested." Marking a device with "unclaim requested" may be performed in a variety of ways that are well known in the field of computer science. In some embodiments, marking the device with "unclaim requested" may comprise marking an added field in the kernel data structure that the USB core library fills in for the device, as illustrated at 654 of FIG. 6B If the system is in the state of "user mode drivers not enabled" then the method skips to 708. At 708, the device is presented to the first kernel mode driver in the core library data structure of kernel mode USB drivers, illustrated in FIG. 2B at 250. Step 708 corresponds to step 304 of FIG. 3A. At step 710, the probe routine is called and it is determined if the device matches the driver, as with step 306 of FIG. 3A. If the device matches the driver, the driver may be referred to as the "matching driver." If the device does not match the driver, then the method skips to step 718 where it is determined if there are any more kernel mode USB drivers in the data structure illustrated in FIG. 2B, as in step 310 of FIG. 3A.

If the device does match the kernel mode USB driver, then at 712 it is determined whether the device will be claimed by the kernel mode USB driver. In some embodiments, this determination may be made by an extended probe routine that continues to check information about the device after it has determined there is the kernel mode USB driver that matches the device. FIG. 8 provides a more detailed description of the method for determining if the device will be claimed by the matching kernel mode USB driver at 712.

If it is determined that the device will be claimed, then the device is claimed by the kernel mode USB driver at 714 as in step 308 in FIG. 3. If the device is claimed by the kernel mode USB driver, then it is unavailable to be claimed by user mode USB drivers and is marked as such, as illustrated at step 602 of FIG. 6A and described above. As discussed above, this step may be performed in some embodiments, by marking a field in the data structure illustrated in FIG. 6B at 650.

Figure 1:
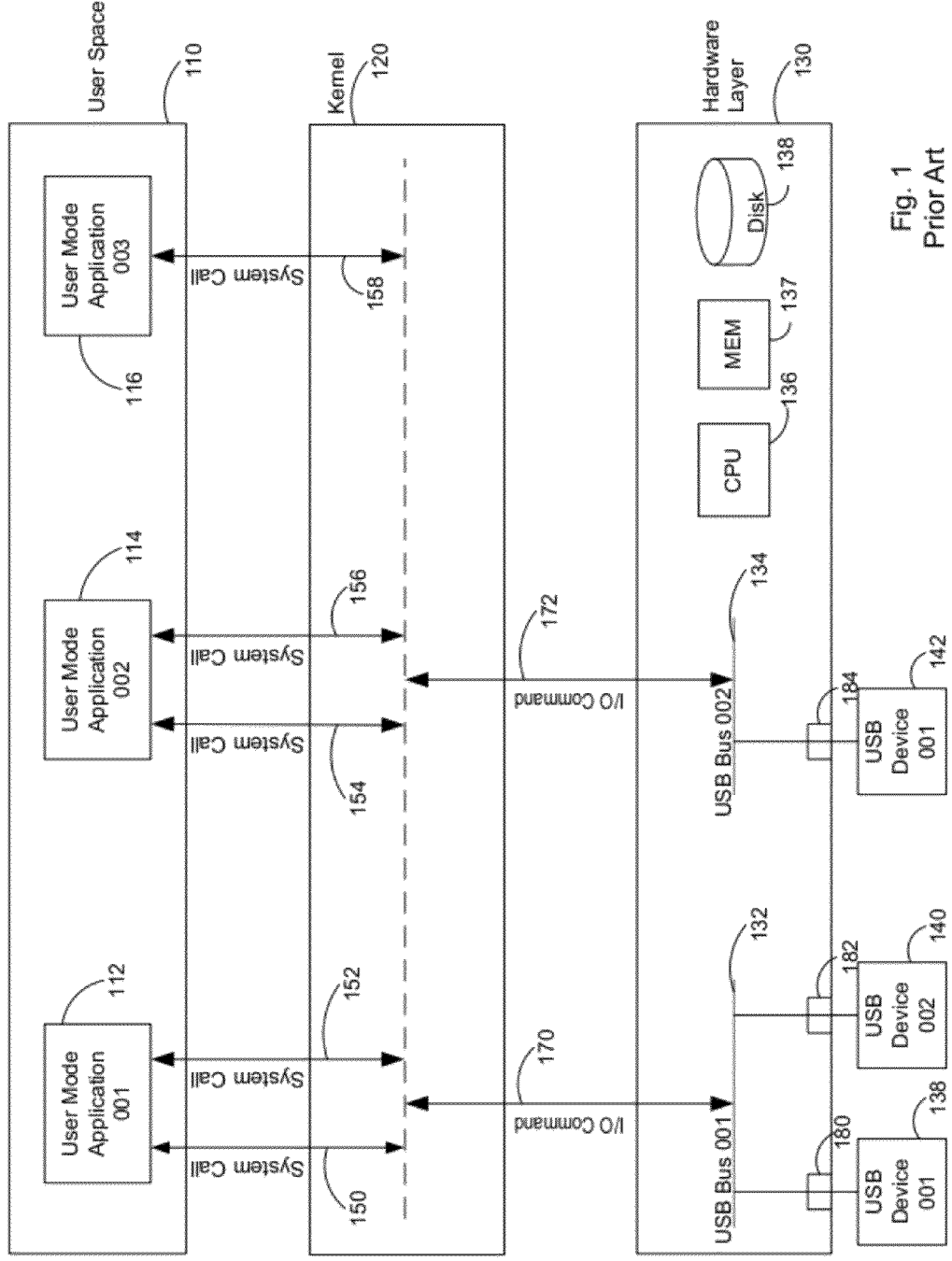
FIG. 1 is a diagram illustrating an operating system acting as an interface between the user and the computer hardware.
Figure 2A:
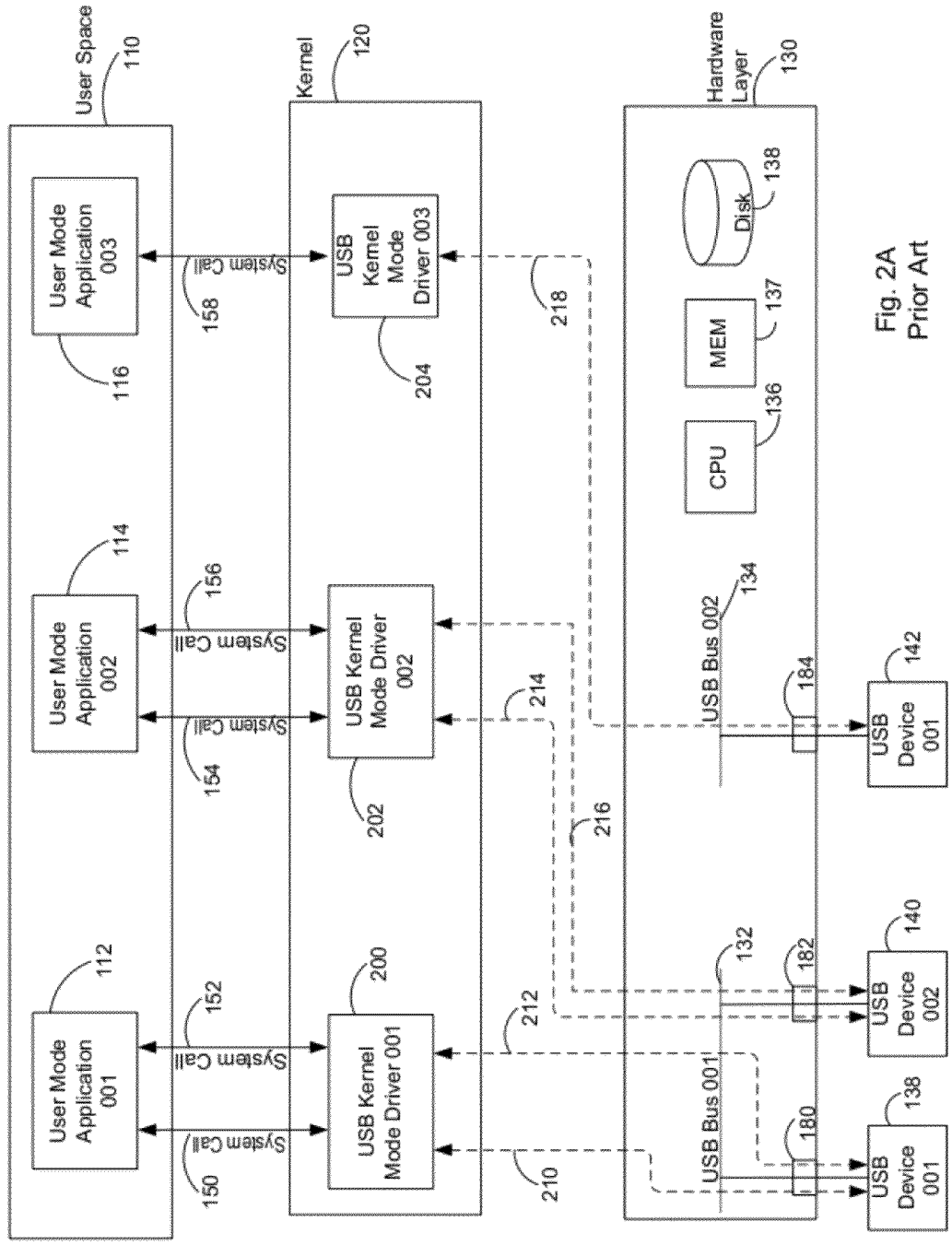
FIG. 2A is a diagram illustrating kernel mode drivers for USB devices.
Figure 2B:
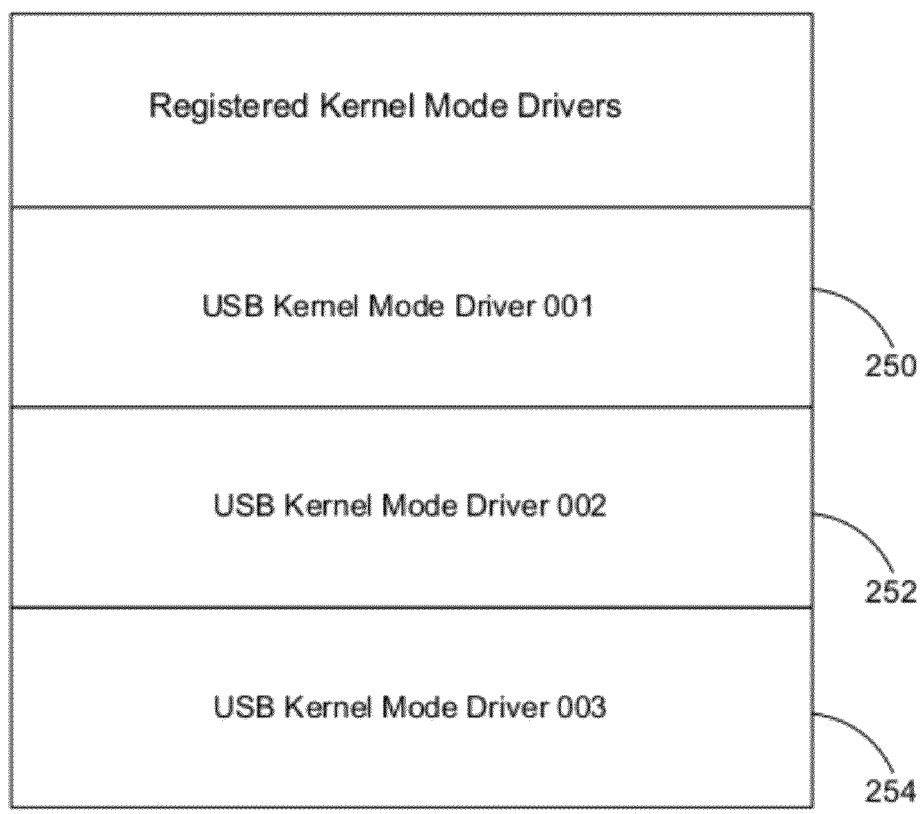
FIG. 2B is a diagram illustrating a data structure in the kernel core library storing a list of the registered kernel mode devices.

If the device will not be claimed by the kernel mode USB driver, then at 718 the data structure illustrated in FIG. 2B is checked to determine if there are more kernel mode USB drivers to which the device has not been presented. If yes, the driver is presented to the next kernel mode USB driver in the data structure at 720 and the method continues at 710, as in steps 312 and 306 of FIG. 3A.

If there are no more kernel mode USB drivers to be presented the device, then it is determined at 722 if the system is in "user mode drivers enabled state." If yes, then the device is marked as available to user mode USB drivers at 724, which corresponds to step 606 of FIG. 6, and thus, the kernel mode device diver that matches the device has been prevented from claiming the device. As discussed in step 606 of FIG. 6, in some embodiments, marking the device available for use by user mode USB drivers may comprise marking a field in an extended data structure for the device in the kernel core library as illustrated at 650 of FIG. 6B. The method then ends.

Figure 3A:
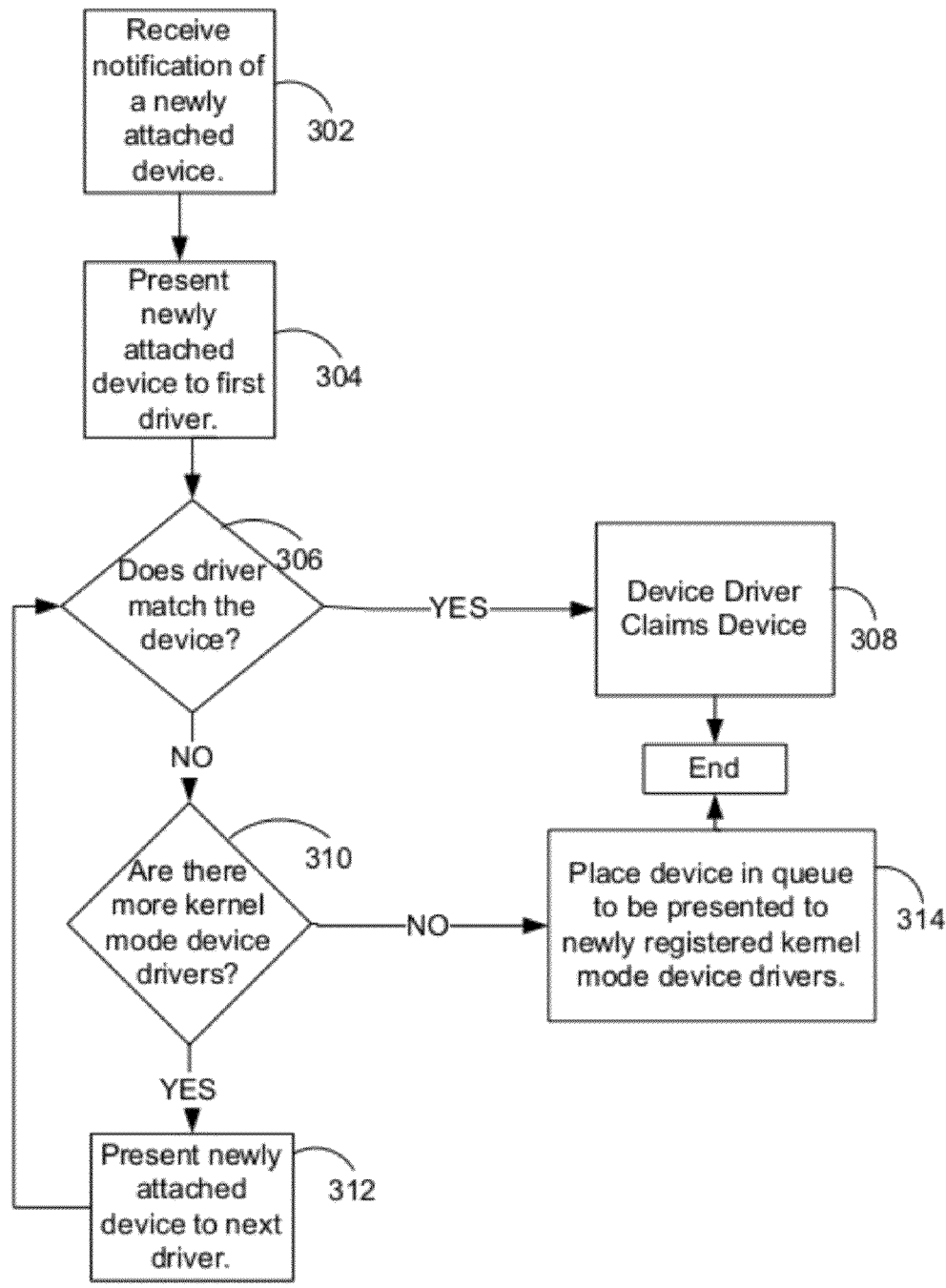
FIG. 3A is a flow chart depicting a method for a kernel mode USB driver to claim a device.
Figure 3B:
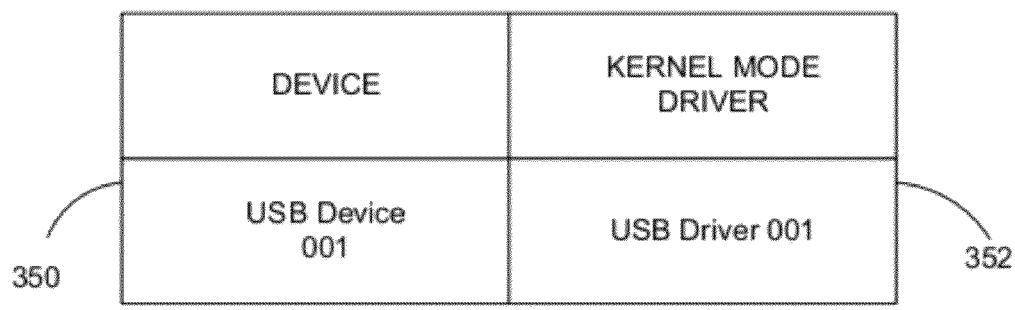
FIG. 3B is a diagram illustrating a data structure the kernel core library stores for each USB device attached to the system.
Figure 4A:
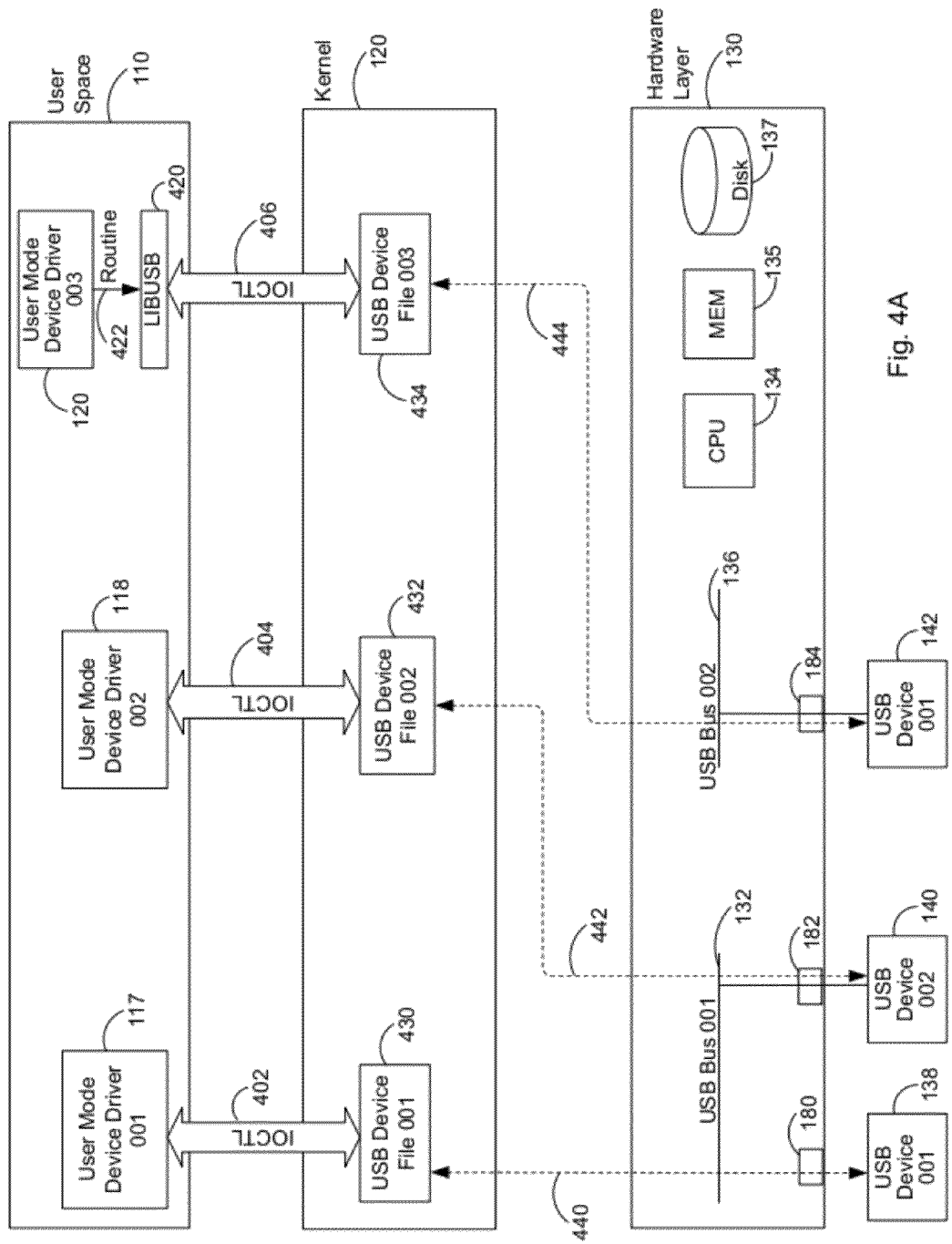
FIG. 4A is a diagram illustrating user mode drivers.

If it is determined at 722 that the device is not in "user mode drivers enabled state" then at 726 the devices is added to a queue of unclaimed devices which will be presented to any newly registered kernel mode USB drivers and ends, as in step 314 of FIG. 3A.

FIG. 8 is a flow chart depicting in more detail an embodiment of step 712, determining whether a kernel mode USB driver that matches a device will claim the device. At 800 it is determined if the device is marked "driver unclaim requested." As explained above, in some embodiments the kernel core library data structure for the device may be extended to include a field for marking the device "driver unclaim requested" as illustrated at 650 of FIG. 6B. If the device is not marked "driver unclaim requested," then it is determined at 802 that the device will be claimed by the kernel mode USB driver, i.e. step 712 is determined to be yes, and the method continues at step 714 of FIG. 7. In some embodiments, step 800 may be performed using the kernel mode USB driver's probe routine that has been extended to include code for performing such a check.

If at step 800 it is determined that the device is marked "driver unclaim requested," then it is determined at 804 if the kernel mode USB driver has a policy of unconditionally respecting driver unclaim requests. In some embodiments, step 804 may be performed using an extended version of the kernel mode USB driver's probe routine. If at 804 it is determined that the kernel mode USB driver unconditionally respects driver unclaim requests, then at 806 it is determined that the device will not be claimed by the kernel mode USB driver, i.e. step 712 will be determined to be no.

If at step 804 it is determined that the kernel mode USB driver does not have a policy for unconditionally respecting driver unclaim requests, then at 808, it is determined if the kernel mode USB driver has a policy to conditionally respect such requests based on the type or subtype of the USB device that has been presented. Again, in some embodiments, this step may be performed using an extended version of the driver's probe routine. If the kernel mode USB driver does not have such a policy, then it will be determined at step 802 that the device will be claimed by the kernel mode USB driver, i.e. step 712 will be determined to be yes.

If the kernel mode USB driver does have such a policy, then at step 810 it will be determined if the device type or subtype is known. Step 810 may also be performed using an extended version of the kernel mode USB driver's probe routine. If at 810, the device (sub)type is not known, then the method continues at 812, in which the USB device is provisionally claimed by the kernel mode USB driver and the device (sub)type is snooped by examining all data returned by the device in a device type specific manner. For example, in the case of USB storage devices (disks, flash drives, cd roms, etc.), the USB storage driver may be extended to examine all data returned by the device in response to SCSI inquiry commands in order to distinguish between, for example, disks and cd roms. Once the device (sub)type has been determined at 812, the method continues at 814. If the device (sub)type is known at 810, the method continues at 814.

At 814, it is determine if the device's (sub)type matches the type of device for which the kernel mode USB driver respects unclaim requests. This determination may be made using an extended version of the kernel mode USB driver' probe routine. If the device (sub)type does match a type for which the kernel mode USB driver respects unclaim requests, then at 816 the device is unclaimed and at 806 it is determined that the kernel mode USB driver will not claim the device, i.e. 712 will be determined to be "no." If the device (sub)type does match a type for which the kernel mode USB driver respects unclaim requests, then at 802 it is determined the device will be claimed by the kernel mode USB driver, i.e. 712 will be determined to be "yes," and the method will continue at 714.

In some embodiments, the kernel mode USB Human Interface Driver ("HID") may have a policy that is conditional based on type as determined at 808 of FIG. 8. In some of those embodiments, the HID driver will not respect unclaim requests for keyboards, but may respect unclaim requests for non-bootable HID devices that do not support the HID boot specification, i.e. they are not available to the operating system at boot time. The (sub)type of these devices may be determinable at 810.

In some embodiments, the kernel mode USB storage driver will have a policy that is conditional based on type as determined at 808; however, the (sub)type of these devices may not be determinable at 810. In some of those embodiments, the driver may claim cd rom devices, but not claim disks devices unless the disk is a disk, such as a USB flashdrive, from which the operating system boots. Because the (sub)type of storage device may not be known until a SCSI inquiring command is run on the disk, the storage device may be provisionally claimed and snooped at 812 until the device (sub)type is known, for example until the SCSI inquiry command is run. Once the device (sub)type is known, the method continues at step 814.

FIG. 9A is a flow chart illustrating an embodiment of a method for preventing a user mode USB driver from opening a device for write if the device is claimed by a kernel mode driver or in use by another user mode USB driver. At 900 a request to open a device is received from a user mode USB driver. At 902 the return value ("ret") for opening the device and the return value ("write_ret") for opening the device for write are set to 0. The return value is the value that a routine, such as one for opening a file or opening the file for write, will return (e.g. to the user mode USB driver) when it finishes executing. Routines that perform operations on files, such as opening the file, often have return values that indicate whether the routine was successfully executed or whether it failed. For example, in some operating systems including, but not limited to, UNIX, LINUX, and VMware® ESX, a return value equal to or greater than 0 indicates that the routine executed successfully and a return value of less than 0 indicates the routine failed.

At 904 the device is opened. For example, as explained in the background section in some operating systems including, but not limited to, UNIX, LINUX, and VMware® ESX, the device file for the device may be opened. The device open at 904 is performed without regard for file permissions or driver claims. At step 906, it is determined whether the open request failed, i.e. whether the return value is less than 0. For example, if the device were no longer attached to the computer, the device file would not be found and the open file routine would return a value less than 0. If the device open fails at 906 the method will skip to step 918, which is discussed below.

If the device open does not fail, then at 908 it is determined whether the f_open write flag is set. The f_open write flag indicates whether the method requesting the device be opened, such as the user mode USB driver, has permission to write to the device file. If the f_open write flag is not set, then the device will continue at 918. If the f_open write flag is set, then at 910 the write_ret is set to a value indicating a failure. For example the write_ret may be set to –EBUSY, the value used in some operating systems, including but not limited to UNIX, LINUX, and VMware® ESX, for indicating that a file open failed because the device was in use by another driver. At step 912, it is determined whether the device is available for user mode USB drivers. For example, a field in the core library data structure for the device indicating whether the device is available for user mode USB drivers, as illustrated at 656 of FIG. 6B, may be checked. If the device is not available for user mode USB drivers then the method skips to step 918. If the device is available for user mode USB drivers, then it is determined at step 914 whether the device is in use by another user mode USB driver, for example by checking the field illustrated at 652 of FIG. 6B. If the device is in use by another driver, then the method skips to the 918.

If the device is not in use by another driver, then at 916 the device is marked as in use, for example by checking the field illustrated at 652 of FIG. 6B, and the write_ret is set to 0 to indicate that the device has been successfully opened for write.

At 918, it is determined whether the write open failed, i.e. the write_ret value is checked. For example, if the write_ret is set to –EBUSY at 910, and either the device is not available for user mode USB drivers at 912 or is in use by another user mode USB driver at 914, then the method will skip 916 and the write_ret will continue to be –EBUSY indicating a failure. If the write open failed, then at 920, the f_open write flag is cleared, and the close routine is called. At 922, the f_open write flag will be restored, and the method will continue at 924. If at 918 it is determined that the open for write did not fail the method will continue at 924.

At 924, the return value for the open ("ret") and the open for write ("write_ret") are returned and the method ends.

Figure 9B:
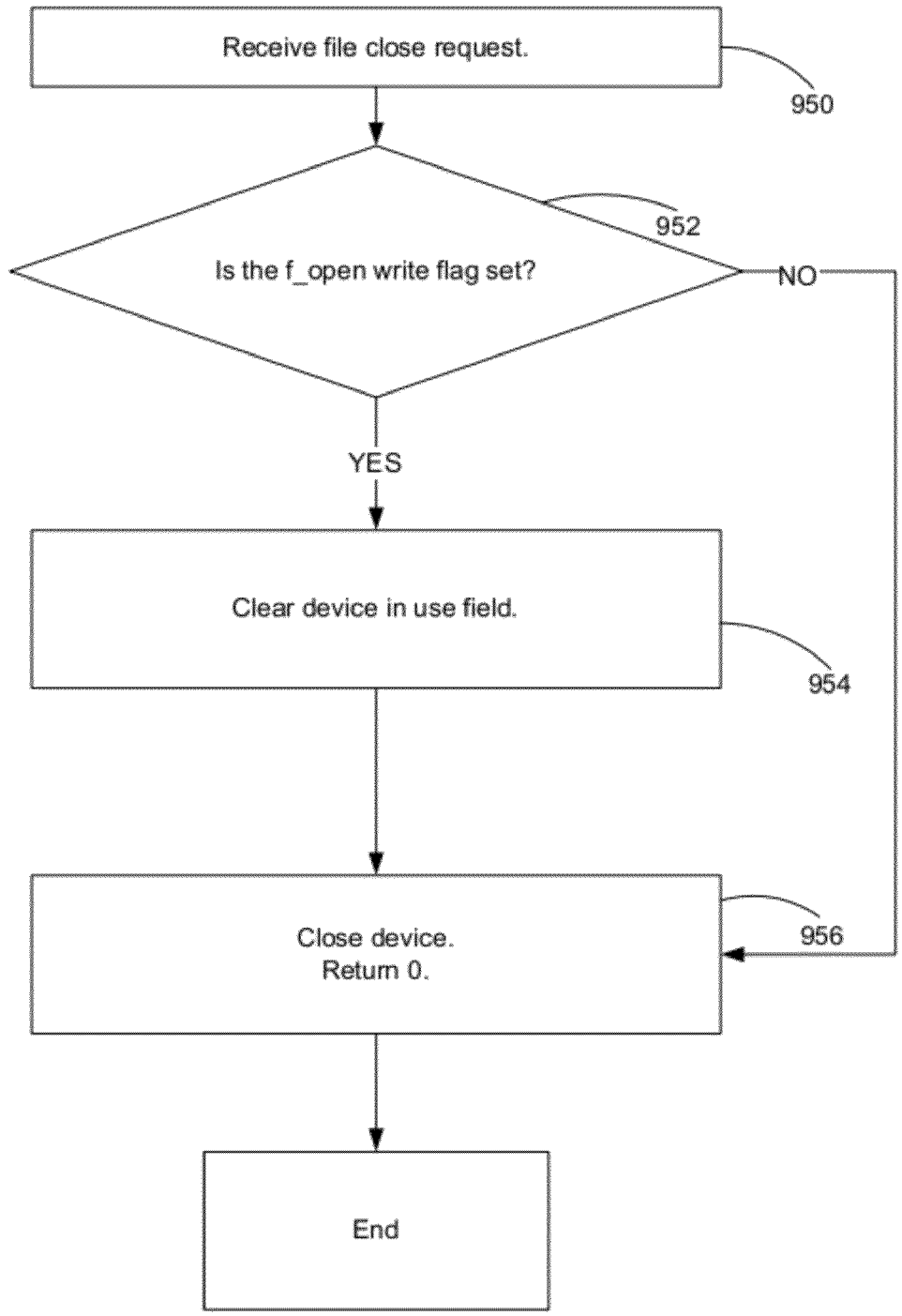
FIG. 9B is a flow chart illustrating an embodiment of a method for closing a file opened by a user mode USB driver.

FIG. 9B is a flow chart illustrating an embodiment of a method for closing a file opened by a user mode USB driver. At step 950, a file close request is received. At step 952, it is determined if the f_open write flag is set. If the f_open write flag is set at 952, then the device is closed at 956.

If the f_open write flag is not set, then the device is use field is not cleared before the device is closed at 956. As also explained above, the f_open write flag will be cleared if the open for write fails, e.g. if the device is in use by another driver. Therefore, the method of FIG. 9 prevents one user mode USB driver from clearing the in use field 652 of FIG. 6B for a device that is in use by another user mode USB driver.

As 956, the device is closed, 0 (or some other value indicating success) is returned and the method ends.

Figure 9C:
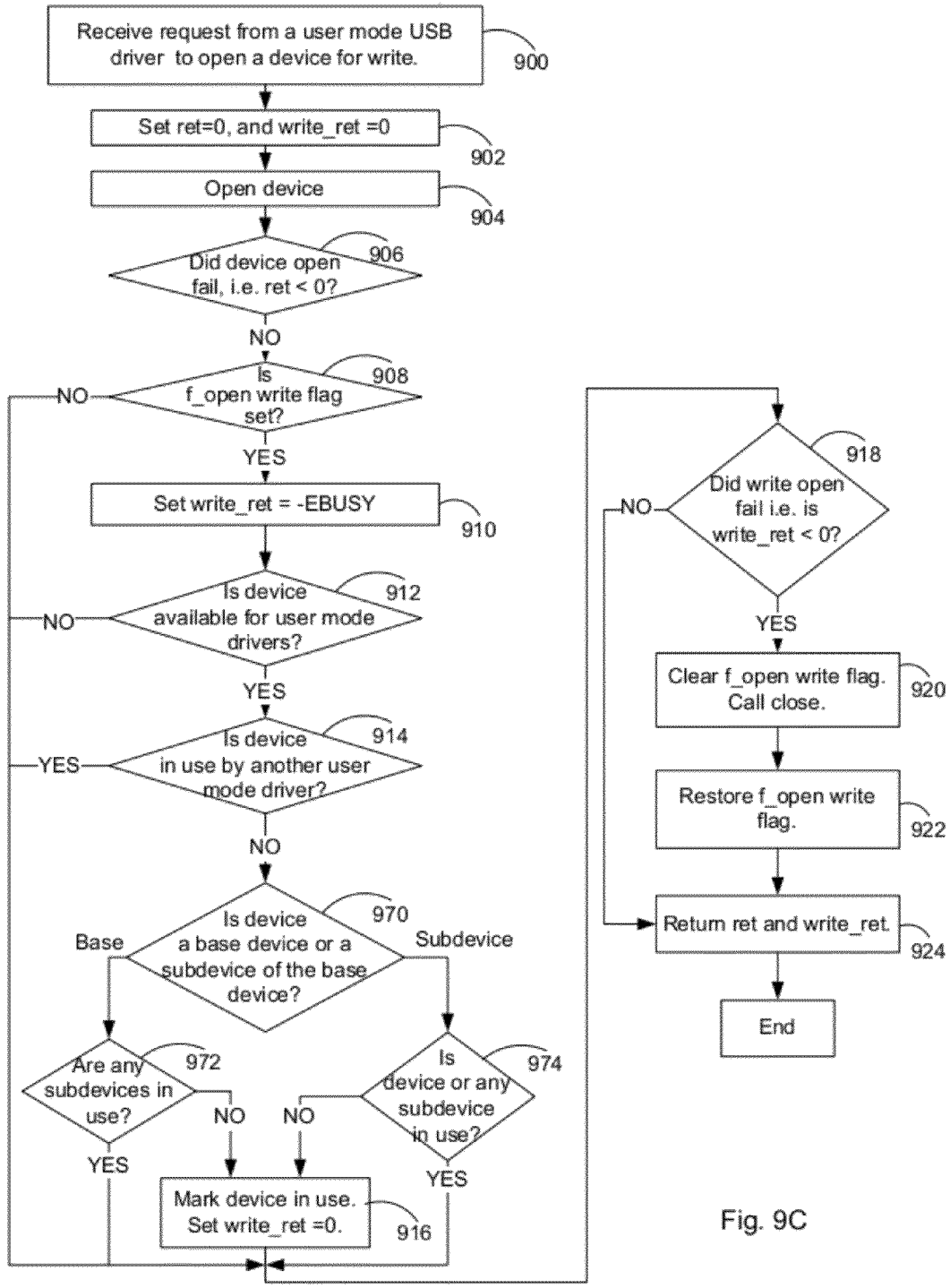
FIG. 9C is a flow chart illustrating an embodiment of the method of FIG. 9A for a device with more than one interface type

FIG. 9C is a flow chart illustrating an embodiment of the method of FIG. 9A for a device with more than one interface type, for example a device which includes a HID interface and a storage interface. Steps 900-914 are the same as steps 900-914 of FIG. 9A discussed in detail above. If it has been determined that the device is not in use by another user mode USB driver at 914 than at 970 it is determined if the device to be claimed is a base device or a subdevice of the base device, i.e. one of the device's interface types. If the device is a base device then at 972 it is determined if any of the subdevices are in use by another user mode USB driver. If no, then the method continues at step 916. If one of the subdevices is in use by another user mode USB driver, then the method continues at 918. If the device is a subdevice, then at 974 it is determined if the overall device or any other subdevices is in use by another user mode USB driver. If no, then the method continues at step 916. If yes, then the method continues at 918.

FIG. 10 is a flow chart illustrating an embodiment of a method for preventing a user mode USB driver from performing IOCTL operations on a device other than read-safe IOCTLs unless the driver has successfully opened the file for write. At step 1000 a request is received from a user mode USB driver to perform an IOCTL on a USB device. At step 1002, the IOCTL return is set to 0 (i.e. IOCTL_ret=0). At step 1004, it is determined if the IOCLT request is for a read-safe IOCTL, i.e. whether it is one of the IOCTLs that have been determined to be safe for read access. In some embodiments, the user mode USB drivers may include a function which will determine whether an IOCTL is read-safe. In some embodiments, a data structure may be kept in the operating system kernel which includes a list of all read-safe IOCTLs. In such embodiments, determining whether the requested IOCTL is one of the read-safe IOCTLs involves checking the data structure to determine if the IOCLT requested is contained in the data structure. In some embodiments, the list of read-safe IOCTLs includes operations on the mandatory USB endpoint 0, a read only endpoint that all USB devices are required to implement. In some embodiments, the list of read-safe IOCTLs may include the list of IOCLTS that are needed for the lusb call, which lists all usb devices attached to a system. In some embodiments, the list of read-safe IOCTS may include one or more of the following: CLAIMINTERFACE; CONNECTINFO; CONTROL(32); GETDRIVER; or RELEASE INTERFACE.

If the IOCTL is determined to be read-safe at 1004, then the method continues at 1010 discussed below. If the IOCTL is not read-safe, then at 1006 the IOCTL_ret is set to a value indicating failure, such as –EPERM, the error code used in some operating systems including but not limited to, UNIX, LINUX, and VMware® ESX, to indicate that a process, such as the user mode USB driver, does not have the correct permission to execute the IOCTL. At 1008, it is determined whether the requesting user mode USB driver has opened the device file for write. In some embodiments, determining if the user mode USB driver has opened the device file for write at 1008 may comprise checking to determine if the user mode USB driver has the write handle for the device file. When a user mode USB driver has successfully opened a file for write, e.g. through a method such as the one illustrated in FIG. 9, the user mode USB driver will be given a write handle for the file, i.e. a pointer to an entry for the opened file in a data structure stored by the kernel containing details about all of the files a driver, or other process, has open. A pointer contains the address in memory of an entity such as the entry in a data structure. If the requesting user mode USB driver has not opened the device file for write, the method continues at 1018 as discussed below. If the user mode USB driver has opened the file for write, then the method continues at 1010.

AT 1010, the IOCTL_ret is set to a value indicating a success, such as 0. At 1012, the IOCTL is performed. At 1014 it is determined if the IOCTL failed. If the IOCLT failed, then at 1016 the IOCTL_ret is set to a value indicating failure, such as a value less than 0, and the method continues at step 1018. If it is determined that the IOCTL did not fail at 1014, then the method continues directly to 1018. At 1018, the IOCTL_ret is returned and the method ends.

Figure 11:
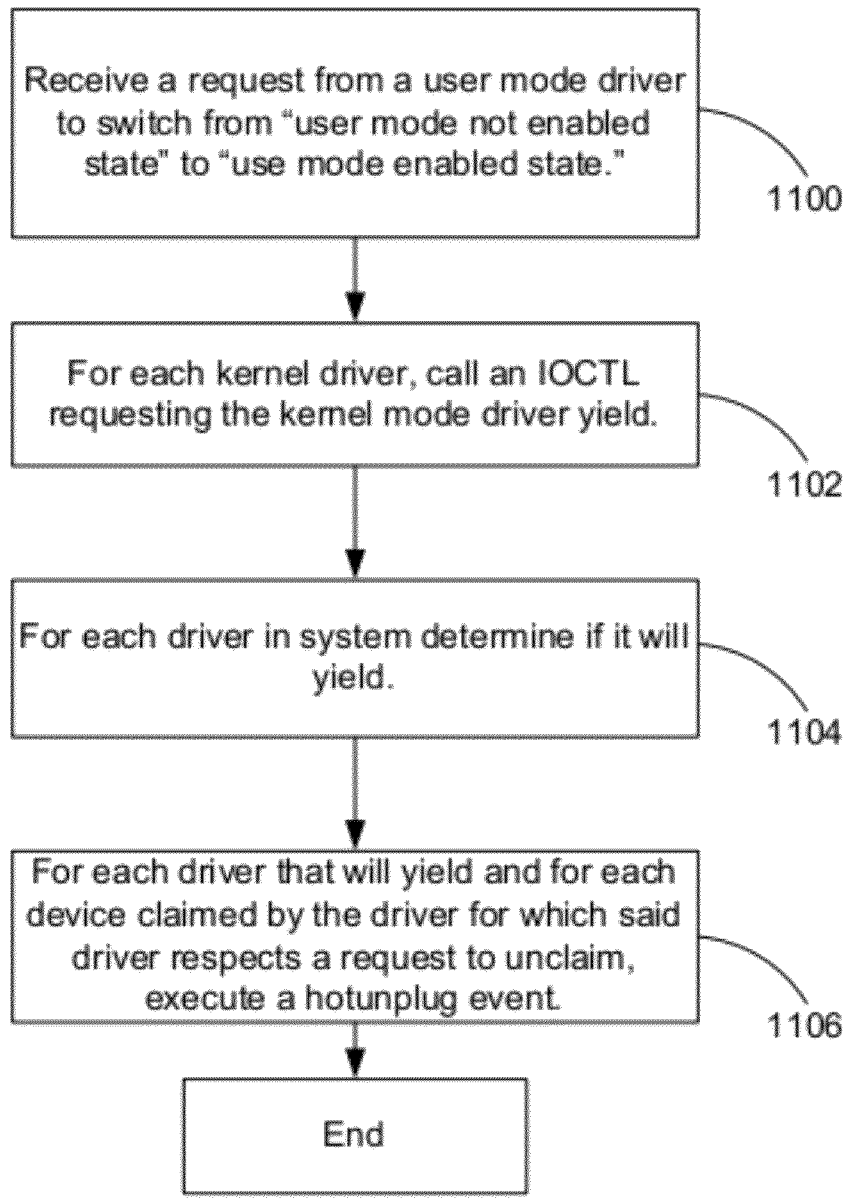
FIG. 11 is a flow chart illustrating an embodiment of a method for transitioning from the state of "user mode drivers not enabled" to the state of "user mode drivers enabled."

FIG. 11 is a flow chart illustrating an embodiment of a method for transitioning between the state of "user mode drivers not enabled" to the state of "user mode drivers enabled." At 1100, a request is received to transition between the state of "user mode drivers not enabled" to the state of "user mode drivers enabled." This request may be received from a user mode USB driver. At 1102, an IOCTL is called that has been written to request that the each kernel mode driver yield. At 1104, for each driver in the system is it determined if the driver will yield one or more devices. At step 1106, for each driver that will yield and for each device claimed by the driver for which said driver respects a request to unclaim the device, a hot unplug event will be executed as if a request to remove the device from the system had been received. A hot unplug event saves any state to a device and ensure that the operations being performed by a driver on the device will be completed before the device yields. Once a hot unplug event has been executed for all kernel mode USB drivers that will yield, the method ends.

Figure 12:
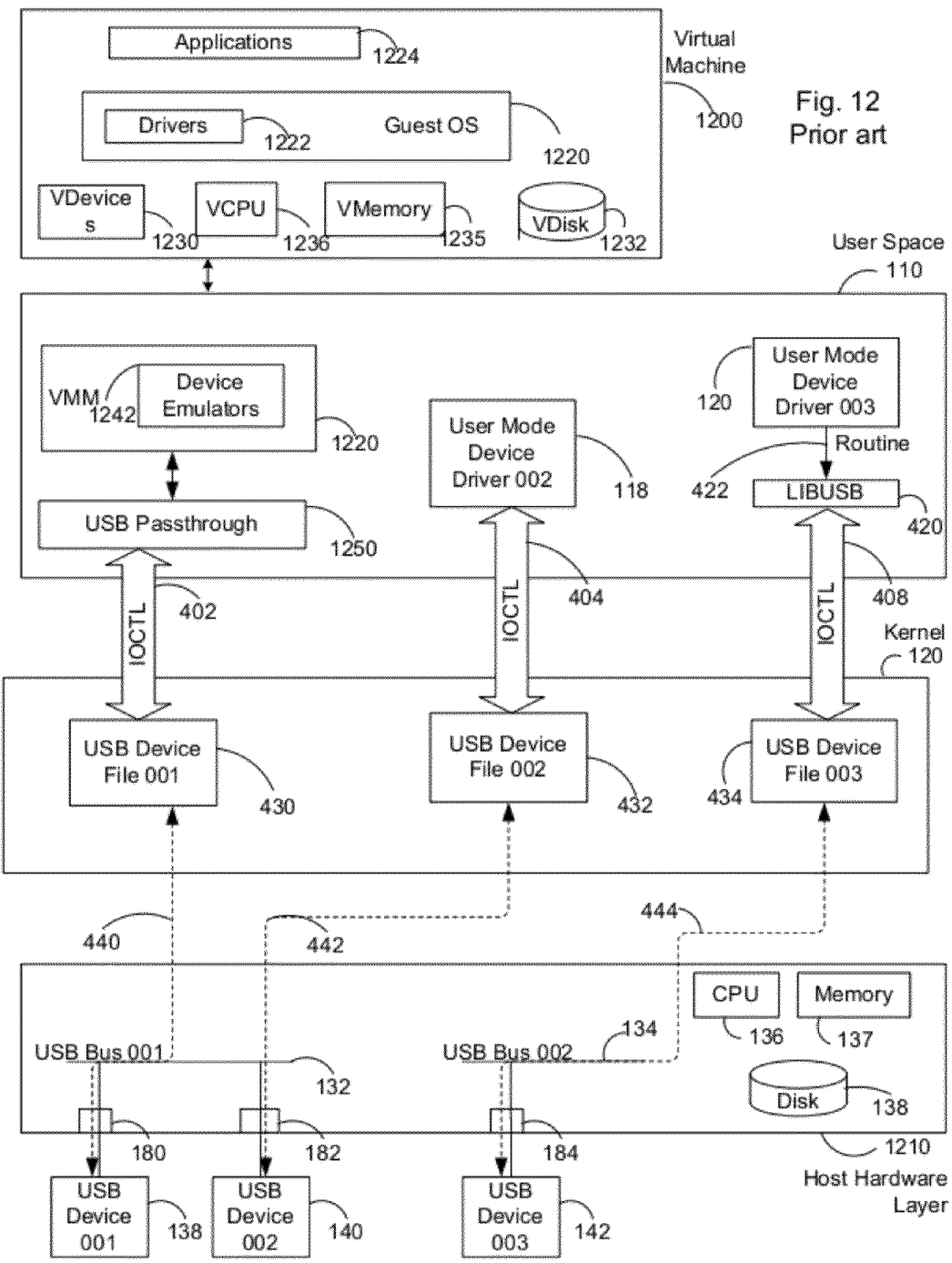
FIG. 12 is a diagram illustrating a USB passthrough application for a virtual machine.

In some embodiments of the invention, the user mode application controlling the drivers is a USB passthrough application for a virtual machine. FIG. 12 is a diagram illustrating a USB passthrough application for a virtual machine. As is well known in the field of computer science, a virtual machine (VM) is a software abstraction—a "virtualization"—of an actual physical computer system. FIG. 12 illustrates, in part, the general configuration of a virtual machine 1200, which is installed as a "guest" on "host" hardware 1210.

As FIG. 12 shows, the host hardware layer 1210 includes the hardware of the computer, such as one or more processors (CPU's) 136, system memory 137, a storage device, such as a disk 138, USB buses 132, 136, and USB devices 138, 140, and 142. Each VM 1200 (only one shown) will typically include at least one virtual CPU 1236, a virtual disk 1237, and a virtual system memory 1235. The virtual system will also typically include a guest operating system (which may simply be a copy of a conventional operating system) 1220, and various virtual devices 1230, in which case the guest operating system ("guest OS") will include corresponding kernel mode USB drivers 1222, or user mode USB drivers operating in the virtual user space 1224. All of the components of the VM may be implemented in software using known techniques to emulate the corresponding components of an actual computer. For example, the VDevices 1230 may include virtual USB devices which would be software emulating the corresponding USB devices attached to the computer 138, 140, and 142.

If the VM is properly designed, then it will not be apparent to the user that any applications running within the VM user space 1224 are running indirectly, that is, via the guest OS and virtual processor. Applications running within the VM will act just as they would if run on a "real" computer, except for a decrease in running speed that will be noticeable only in exceptionally time-critical applications. Executable files will be accessed by the guest OS from the virtual disk or virtual memory, which will simply be portions of the actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

Some interface is usually required between a VM and the underlying host platform (in particular, the CPU), which is responsible for actually executing VM-issued instructions and transferring data to and from the actual memory and storage devices. A common term for this interface is a "virtual machine monitor" (VMM), illustrated as component 1240. A VMM is usually a thin piece of software that runs directly on top of a host, or directly on the hardware, virtualizes all the resources of the machine. Among other components, the VMM therefore usually includes device emulators 1242, which may constitute the virtual devices 1230 that the VM 1200 addresses. The interface exported to the VM is then the same as the hardware interface of the machine, so that the guest OS cannot determine the presence of the VMM. VMM receives requests from the drivers in the guest OS, and passes these request through to the USB host controller 180 using USB passthrough 1250. USB passthough 1250 is an application running in user space on the host machine that acts as a user mode device driver, taking the requests that the VMM receives from the guest operating system and passing them through to the host controller 180. Thus, through USB passthrough, the USB devices may be given in their entirety to the operating system in the guest OS. In some embodiments, USB passthrough may be implemented using device files such as chardevs or proc nodes as illustrated at 430.

Although the foregoing invention has been described in some detail for purposes of clarity of understanding, it will be apparent that certain changes and modifications may be practiced within the scope of the appended claims. It should be noted that there are many alternative ways of implementing both the method and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A system for safely sharing universal serial bus (USB) devices comprising a processor and a memory coupled with the processor, wherein the memory is configured to provide the processor with instructions for:
   receiving a request to switch from a state in which user mode drivers are not enabled to a state in which user mode drivers are enabled;
   for each kernel mode USB driver in the system, calling an I/O control (IOCTL) in each kernel mode USB driver requesting that the kernel mode USB driver yield one or more devices on which it has a claim;

for each kernel mode USB driver in the system, determining if the kernel mode USB driver will yield one or more devices on which it has a claim; and for each kernel mode USB driver that will yield and for each device claimed by the kernel mode USB driver for which the kernel mode USB driver respects a request to unclaim the device, executing a process as if there had been a hot unplug event on the device.

2. The system of claim 1, wherein the request is received from a user mode USB driver.

3. The system of claim 1, wherein executing the process comprises saving any state for each device and ensuring that operations being performed by each kernel mode USB driver on each device will be completed before each device yields.

4. The system of claim 1, further comprising marking each device claimed by the kernel mode USB driver for which the kernel mode USB driver respects a request to unclaim the device as being available for user mode USB drivers.

5. The system of claim 1, wherein the hot unplug event is as if a request to remove each device from the system had been received.

6. The system of claim 1, wherein when in the state in which user mode drivers are enabled, kernel mode USB drivers are prevented from claiming each device.

7. A method for safely sharing USB devices comprising:
receiving at a processor a request to switch from a state in which user mode drivers are not enabled to a state in which user mode drivers are enabled;

for each kernel mode USB driver in the system, calling an IOCTL in each kernel mode USB driver requesting that the kernel mode USB driver yield one or more devices on which it has a claim;

for each kernel mode USB driver in the system, determining if the kernel mode USB driver will yield one or more devices on which it has a claim; and for each kernel mode USB driver that will yield and for each device claimed by the kernel mode USB driver for which the kernel mode USB driver respects a request to unclaim the device, executing a process as if there had been a hot unplug event on the device.

8. The method of claim 7, wherein the request is received from a user mode USB driver.

9. The method of claim 7, wherein executing the process comprises saving any state for each device and ensuring that operations being performed by each kernel mode USB driver on each device will be completed before each device yields.

10. The method of claim 7, further comprising marking each device claimed by the kernel mode USB driver for which the kernel mode USB driver respects a request to unclaim the device as being available for user mode USB drivers.

11. The method of claim 7, wherein the hot unplug event is as if a request to remove each device from the system had been received.

12. The method of claim 7, wherein when in the state in which user mode drivers are enabled, kernel mode USB drivers are prevented from claiming each device.

13. A computer program product for safely sharing USB devices, the computer program product being embodied in a non-transitory computer readable storage medium and comprising computer instructions for:
receiving a request to switch from a state in which user mode drivers are not enabled to a state in which user mode drivers are enabled;

for each kernel mode USB driver in the system, calling an IOCTL in each kernel mode USB driver requesting that the kernel mode USB driver yield one or more devices on which it has a claim;

for each kernel mode USB driver in the system, determining if the kernel mode USB driver will yield one or more devices on which it has a claim; and for each driver that will yield and for each device claimed by the kernel mode USB driver for which the kernel mode USB driver respects a request to unclaim the device, executing a process as if there had been a hot unplug event on the device.

14. The computer program product of claim 13, wherein the request is received from a user mode USB driver.

15. The computer program product of claim 13, wherein executing the process comprises saving any state for each device and ensuring that operations being performed by each kernel mode USB driver on each device will be completed before each device yields.

16. The computer program product of claim 13, further comprising marking each device claimed by the kernel mode USB driver for which the kernel mode USB driver respects a request to unclaim the device as being available for user mode USB drivers.

17. The computer program product of claim 13, wherein the hot unplug event is as if a request to remove each device from the system had been received.

18. The computer program product of claim 13, wherein when in the state in which user mode drivers are enabled, kernel mode USB drivers are prevented from claiming each device.

* * * * *